United States Patent [19]

Ando et al.

[11] Patent Number: 4,601,990

[45] Date of Patent: Jul. 22, 1986

[54] HIGH-ALUMINA CERAMIC COMPOSITION

[75] Inventors: Minato Ando; Masaaki Ito; Takashi Kato, all of Aichi, Japan

[73] Assignee: NGK Spark Plug Co., Ltd., Aichi, Japan

[21] Appl. No.: 682,715

[22] Filed: Dec. 17, 1984

[51] Int. Cl.$^4$ ............................................. C04B 35/10
[52] U.S. Cl. ..................................................... 501/153
[58] Field of Search ........................................... 501/153

[56] References Cited

U.S. PATENT DOCUMENTS

| | | | |
|---|---|---|---|
| Re. 27,083 | 3/1971 | Klinger et al. | 501/153 |
| 3,377,176 | 4/1968 | Wolkodoff et al. | 501/153 |
| 3,627,547 | 12/1971 | Bailey | 501/153 |
| 3,880,971 | 4/1975 | Pantanelli | 501/153 |
| 4,031,177 | 6/1977 | Auriol et al. | 501/153 |
| 4,150,317 | 4/1979 | Laska et al. | 501/153 |

*Primary Examiner*—Mark L. Bell
*Attorney, Agent, or Firm*—Sughrue, Mion, Zinn, Macpeak, and Seas

[57] ABSTRACT

A high-alumina ceramic composition is described, having a low dielectric loss in the extremely high frequency range, said composition consisting essentially of $Al_2O_3$, $SiO_2$, and $MgO$, with the $Al_2O_3$ content being in the range of from 99.7 to 99.9% and the $SiO_2/MgO$ weight ratio being in the range of from 1.0/1 to 0.2/1.

1 Claim, No Drawings

HIGH-ALUMINA CERAMIC COMPOSITION

BACKGROUND OF THE INVENTION

The present invention relates to a high-alumina ceramic composition having a small dielectric loss in the high frequency range.

Conventional waveguides used with electronic circuits designed to operate with millimeter waves in the high frequency range ($\geq 30$ GHz) are typically made of metals. Recently, titanates such as barium titanate, strontium titanate, and calcium titanate, as well as alumina ceramics have been considered as promising alternatives to metals as the material for waveguides operating with millimeter waves. However, titanates have a dielectric loss tangent (tan $\delta$) of the order of $10^{-4}$ and are too high in dielectric loss to make the titanates suitable for operation with millimeter waves. Alumina ceramics having a satisfactory low tan $\delta$ are very difficult to produce on a commercial scale, and hence are not suitable for use in practical applications.

SUMMARY OF THE INVENTION

The present invention provides a ceramic composition consisting essentially of $Al_2O_3$, $SiO_2$, and MgO, with the $Al_2O_3$ content being in the range of from 99.7 to 99.9% and the $SiO_2$/MgO weight ratio being in the range of 1.0/1 to 0.2/1. By controlling the $SiO_2$/MgO ratio within this specified range, the ceramic composition of the present invention has a dielectric loss tangent (tan $\delta$) of the order of as low as $10^{-5}$, even if the alumina content is reduced to a content which is suitable for use in practical application, that is, 99.7%.

DETAILED DESCRIPTION OF THE INVENTION

As the result of extensive investigations, the present inventors have found that alumina ceramics have a satisfactorily low tan $\delta$, of the order of about $10^{-5}$ if their alumina content is 99.9% (by weight) or higher. However, alumina ceramics with an $Al_2O_3$ content of 99.9% or more are very difficult to produce on a commercial scale, and hence are not suitable for use in practical applications, as hereinafter described.

The reason why the alumina ceramics that can be used as the material for waveguides designed to operate with millimeter waves must have an alumina content of at least 99.9% is as follows. If sintered alumina comprises large crystal grains, the resultant increase in anisotropy causes an increased dielectric loss. In order to avoid this problem, MgO and $SiO_2$ have been added as a crystal growth restrainer and a sintering aid, respectively. However, these additives produce crystals other than $Al_2O_3$ at the grain boundaries of the alumina crystals; MgO forms spinel ($Al_2O_3 \cdot MgO$) and $SiO_2$ forms mullite ($3Al_2O_3 \cdot 2SiO_2$). These undesired crystals also cause an increased tan $\delta$. Therefore, in order to avoid the formation of spinel and mullite due to the reaction of MgO and $SiO_2$ with $Al_2O_3$, the addition of these two compounds should be minimized.

When the alumina ceramics which have an alumina content of 99.9% or higher are produced, high purity starting alumina (for example, 99.995% pure alumina) must be used. However, when the alumina ceramics of the present invention are produced, the starting alumina may have a purity of 99.7% or higher. The starting alumina is conventionally produced by various processes such as Bayer's process, a process comprising a thermal decomposition of ammonium carbonate, a process comprising a hydrolysis of alcoholate or the like. An inexpensive starting alumina having a purity of less than 99.9% is almost produced by Bayer's process. The impurities thereof mainly contain $SiO_2$ which is known as sintering aid of alumina. Therefore, the alumina ceramics of the present invention are suitable for production on a commercial scale, because the inexpensive starting alumina produced by the conventional processes as described above can be used.

The reason why the $SiO_2$/MgO weight ratio was controlled within the range of 1.0/1 to 0.2/1 is hereinafter explained. When $SiO_2$ was added in an excess amount beyond the specified ratio range, an effect of MgO was decreased and an abnormal grain growth of alumina was encouraged to form an alumina ceramics containing a number of pores and causing an increased tan $\delta$. When MgO was added in an excess amount beyond the specified ratio range, dense alumina ceramics having uniform alumina crystal grains could be formed. However, these crystals also caused an increased tan $\delta$. This is believed to be ascribable to crystallographic factors (such as a lattice defect or a lattice distortion).

The present invention is hereunder described in greater detail by working example which is given here for illustrative purposes only and by no means intended to limit the scope of the invention.

EXAMPLE

High-purity (99.995%) alumina (UPA, product of Mitsubishi Keikinzoku K.K.), anhydrous silicic acid ($SiO_2$, guaranteed reagent) and magnesium carbonate ($MgCO_3$, guaranteed reagent) were mixed in the weight ratios shown in the following Table. Each mixture had a total weight of 1,000 g. The amount of $MgCO_3$ is shown in the Table in terms of MgO. To each powdery mixture was added deionized water (1,000 ml), polyvinyl alcohol (10 g) and polyethylene glycol (5 g). Each mixture was ground in a polyethylene ball mill (inner capacity: 2,000 ml) with 99.995% pure alumina balls for 15 hours. Each of the resulting slurries was spray-dried through an atomizer (110 mm diameter; Centrifugal Spray Drier; product of Yanagi-Seisakusho Co., Ltd.) at a gas temperature of 170° C. and 7,200 rpm.

The grains obtained had an average size of 50 $\mu$m and were rubber-pressed at 1,500 kg/cm$^2$ (Vertical Single Cylinder-Type High Pressure Rubber Pressing Apparatus; product of Matsuura-Koatsukikai Co., Ltd.) to form cylinders (4 mm diameter $\times$ 100 mm length). After drying, the cylinders were baked in an electric furnace in an oxidizing atmosphere at from about 1,540° to 1,560° C. for 1 hour to obtain cylindrical sintered products (3.3 mm diameter $\times$ 83.3 mm length).

Each of the sintered products was ground with a centerless outside diameter grinder and a diamond cutter to prepare test pieces measuring 3 mm diameter $\times$ 5.0 mm length. The test pieces were washed first with water and then with chlorothene and roasted in an electric furnace at 1,200° C. for 1 hour. The dielectric loss tangent (tan $\delta$) of each test piece was measured using the blow identified apparatus under the noted conditions, and the results are shown in the Table.

Apparatus: Model 8408B, product of Yokogawa-Hewlett-Packard Co., Ltd.
Frequency: 7.4 GHz
Temperature: 20° C.

TABLE

| Sample No. | Composition (wt %) Al$_2$O$_3$ | SiO$_2$ | MgO | SiO$_2$/MgO | Sintering Temperature (°C.) | Dielectric Loss Tangent (tan δ × 10$^{-5}$) | Dielectric Constant | Average Grain Size (μm) | Specific Gravity (g/cm$^3$) | Remarks |
|---|---|---|---|---|---|---|---|---|---|---|
| 1 | 99.7 | 0.30 | 0 | ∞ | 1,550 | 25.6 | 9.58 | 2.2 | 3.91 | SiO$_2$/MgO outside the scope of the present invention |
| 2 | " | 0.20 | 0.10 | 2/1 | " | 10.2 | 9.68 | 1.9 | 3.93 | SiO$_2$/MgO outside the scope of the present invention |
| 3 | " | 0.15 | 0.15 | 1/1 | " | 6.1 | 9.70 | 1.8 | 3.94 | Samples of the present invention |
| 4 | " | 0.10 | 0.20 | 0.5/1 | " | 4.8 | 9.72 | 1.7 | " | Samples of the present invention |
| 5 | " | 0.05 | 0.25 | 0.2/1 | " | 6.7 | 9.71 | 1.5 | " | Samples of the present invention |
| 6 | " | 0 | 0.30 | 0/1 | " | 10.1 | 9.70 | 1.4 | 3.935 | SiO$_2$/MgO outside the scope of the present invention |
| 7 | 99.9 | 0.10 | 0 | ∞ | 1,560 | 13.8 | 9.60 | 2.8 | 3.92 | SiO$_2$/MgO outside the scope of the present invention |
| 8 | " | 0.06 | 0.04 | 1.5/1 | " | 9.6 | 9.70 | 2.1 | 3.94 | SiO$_2$/MgO outside the scope of the present invention |
| 9 | " | 0.05 | 0.05 | 1/1 | " | 4.2 | 9.75 | 2.0 | 3.95 | Samples of the present invention |
| 10 | " | 0.017 | 0.083 | 0.205/1 | " | 4.8 | 9.76 | 1.7 | " | Samples of the present invention |
| 11 | " | 0 | 0.10 | 0/1 | " | 9.5 | 9.74 | 1.6 | 3.94 | SiO$_2$/MgO outside the scope of the present invention |
| 12 | 99.6 | 0.10 | 0.20 | 0.5/1 | 1,540 | 11.1 | 9.61 | 1.8 | 3.93 | Al$_2$O$_3$ outside the scope of the present invention |

As is clear from the Table, Sample Nos. 3, 4 and 5 with 99.7% Al$_2$O$_3$ and having SiO$_2$/MgO weight ratios in the range of from 1/1 to 0.2/1, as well as Sample Nos. 9 and 10 with 99.9% Al$_2$O$_3$ and SiO$_2$/MgO weight ratios of from 1/1 to 0.2/1 had low dielectric loss tangents (tan δ), viz., in the range of from 4.2 to 6.7 × 10$^{-5}$. However, Sample Nos. 1, 2 and 6 with 99.7% Al$_2$O$_3$ having SiO$_2$/MgO weight ratios which were outside the range of 1/1 to 2/1, as well as Sample Nos. 7, 8 and 11 with 99.9% Al$_2$O$_3$ and SiO$_2$/MgO weight ratios which were also outside the range of 1/1 to 0.2/1 had high dielectric loss tangents in the range of from 9.5 to 25.6 × 10$^{-5}$. Sample No. 12 which had an optimum SiO$_2$/MgO ratio of 0.5 (equal to that of Sample No. 4) but whose Al$_2$O$_3$ content was less than 99.7%, did not have a desirably low dielectric loss tangent (11.1 × 10$^{-5}$).

As shown above, the high-alumina ceramic of the present invention has such a low dielectric loss tangent that it can be satisfactorily used as a material for waveguides to be used with an electronic circuit designed to operate at frequencies of 30 GHz or higher without suffering from high dielectric loss.

The starting alumina used in the production of the composition of the present invention should have a high purity. In the Example shown above, 99.995% pure alumina was used, and for the purpose of the present invention, the purity of the starting alumina should preferably be at least 99.7%. For the same reason, anhydrous silica acid and magnesium carbonate used as the other starting materials should have a high purity and in the Example, guaranteed reagents were used for both compounds. However, these compounds are added in very small quantities, so they need not necessarily be as pure as the reagent grade.

While the invention has been described in detail and with reference to specific embodiments thereof, it will be apparent to one skilled in the art that various changes and modifications can be made therein without departing from the spirit and scope thereof.

What is claimed is:

1. A high-alumina ceramic composition having a dielectric loss tangent of 6.7 × 10$^{-5}$ or less, said composition consisting essentially of Al$_2$O$_3$, SiO$_2$, and MgO, with the Al$_2$O$_3$ content being in the range of from 99.7 to 99.9% and the SiO/MgO weight ratio being in the range of from 1.0/1 to 0.2/1.

* * * * *